United States Patent [19]

Herndon

[11] Patent Number: 4,613,101
[45] Date of Patent: Sep. 23, 1986

[54] APPARATUS FOR REPOSITIONING AIRCRAFT EJECTION SEAT DURING THE EJECTION SEQUENCE AND METHOD

[75] Inventor: Gerald F. Herndon, Bellevue, Wash.

[73] Assignee: The Boeing Company, Seattle, Wash.

[21] Appl. No.: 656,092

[22] Filed: Sep. 27, 1984

[51] Int. Cl.[4] ............................................. B64D 25/10
[52] U.S. Cl. ............................. 244/122 R; 244/122 A
[58] Field of Search ........ 244/122 R, 122 A, 122 AE, 244/122 AB, 122 AC, 122 AD; 297/345, 346

[56] References Cited

U.S. PATENT DOCUMENTS

| | | | |
|---|---|---|---|
| 2,227,717 | 1/1941 | Jones | 244/122 R |
| 2,702,677 | 2/1955 | Replogle | 244/122 |
| 2,726,831 | 12/1955 | Bleck | 244/122 |
| 3,077,325 | 2/1963 | Skopp et al. | 244/122 R |
| 3,437,294 | 4/1969 | Martin | 244/122 |
| 3,632,159 | 1/1972 | Barecki | 296/63 |
| 3,735,948 | 5/1973 | McDonald | 244/122 |
| 3,966,146 | 6/1976 | Roberts | 244/122 |
| 4,218,035 | 8/1980 | Jordan | 244/122 |

Primary Examiner—Trygve M. Blix
Assistant Examiner—Rodney Corl
Attorney, Agent, or Firm—Eugene O. Heberer

[57] ABSTRACT

Apparatus and method for repositioning an aircraft ejection seat (10) during an ejection sequence from a semi-reclined position (FIG. 1) to a more upright position (FIG. 2) for safer ejection. The seat (10) is supported in the aircraft by inner catapult cylinders (18, 20) slidably engaged in outer catapult cylinders (14, 16), collapsible truss links (54, 56), connected to the seat at one end and having their other ends connected to slipper blocks (68) slidably engaged on the outer catapults (14, 16). The collapsible truss links hold the seat away from the lower ends of the catapults and firmly in a semi-reclined position during normal operation. There are triangular trusses comprised of seat structure (10), the catapults (14, 16, 18, 20), stops (70) on lower ends of the outer catapult cylinders (14, 16) and the compression links (56). The slipper block (68) are restrained by the down stops (70) and the compression links (56). The seat is prevented from moving forwardly by tension in telescoping collapsible links (54) and by maintaining a fixed length relationship between the telescoping links (54) and the compression links (56) while keeping the inner and outer catapults (14, 16, 18, 20) at a fixed length to form single links by means of internal catapult locks (88).

20 Claims, 11 Drawing Figures

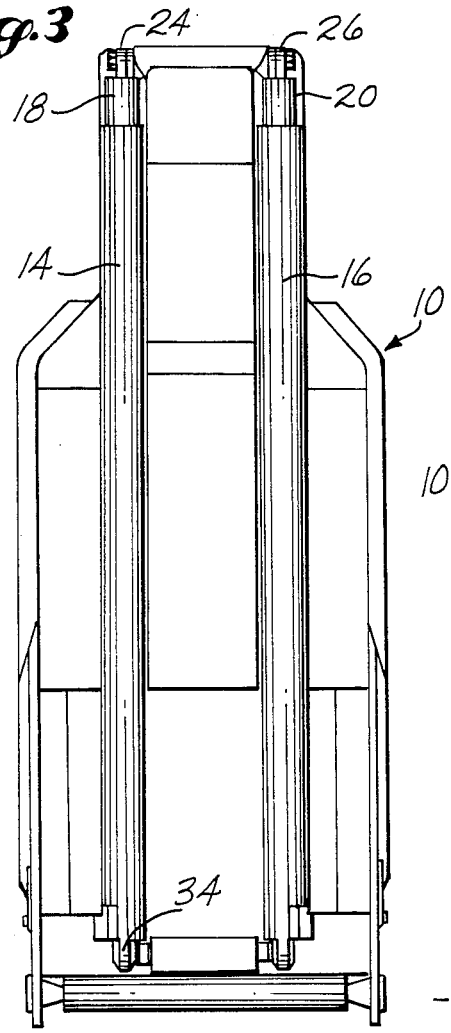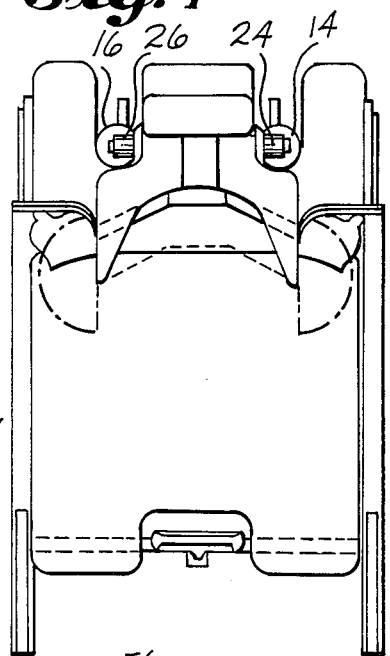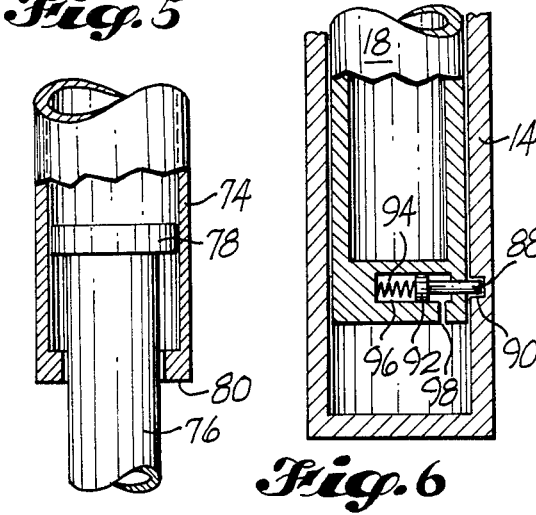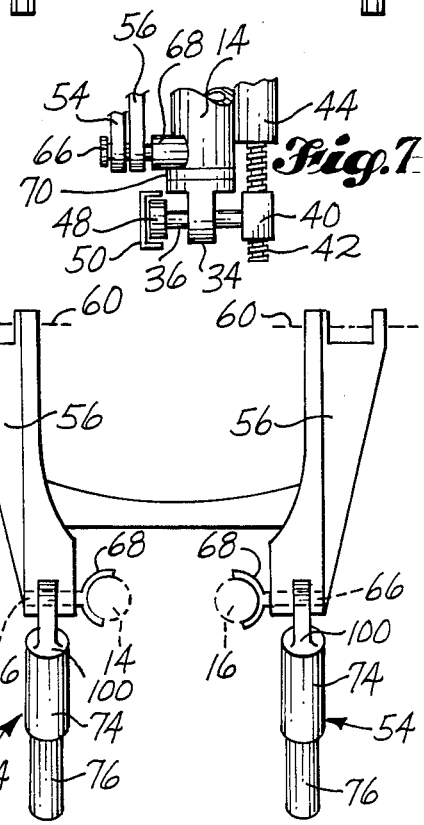

APPARATUS FOR REPOSITIONING AIRCRAFT EJECTION SEAT DURING THE EJECTION SEQUENCE AND METHOD

DESCRIPTION

1. Technical Field

The invention relates to aircraft ejection seats, and more particularly, to seats that are designed for low profile cockpits having seat back angles reclined as much as 60° from the vertical.

2. Background Art

It is difficult, if not impossible, to eject a seat at a angle of 60° from the vertical and ensure clearance of a vertical stabilizer of the aircraft.

Several concepts have been suggested for ejecting low profile seats to reduce the potential for seat/stabilizer collisions. One concept included multiple guide rails which allow the reclined seat to be ejected at a near vertical angle. However, the rails are short and the acceleration must be very high in order to achieve sufficient rail separation velocity for tail clearance. The reclined seat attitude has been found to be unstable in free flight, which means a rapid, controlled pitch maneuver would be necessary immediately after rail separation in order to put the seat into a more stable upright attitude.

A second concept involves rotating the seat on a pivot located at the top of the head rest. The seat is pitched upwardly and out of the cockpit with a catapult thrust until, at a given angle it is disconnected from the pivot release mechanism. The angular velocity is then counteracted by a rocket thrust, tending to pitch the seat in the opposite direction, until it reaches a more upright attitude. A very precise and reliable attitude control system would be required for this concept.

A search of the patent literature discloses a number of systems for ejecting seats, as follows:

U.S. Pat. No. 2,702,677, Replogle
U.S. Pat. No. 2,726,831, Bleck et al
U.S. Pat. No. 3,437,294, Martin
U.S. Pat. No. 3,632,159, Borecki
U.S. Pat. No. 3,735,948, MacDonald et al
U.S. Pat. No. 3,966,146, Roberts
U.S. Pat. No. 4,218,035, Jordan

DISCLOSURE OF THE INVENTION

The invention is an apparatus and method for ejecting low profile seats. During the ejection sequence the seat is repositioned from a semi-reclined position to a more upright position for safer injection.

The structure includes ejection force delivery means or outer catapult cylinders for supporting ejection means or inner catapult cylinders and for supplying force generally in the form of high pressure gas to the inner cylinders to eject them from an outer end of the outer cylinders and to eject the seat from the aircraft.

There are seat support means including the catapults, and means connected to the seat having means engaged with the outer catapults, the means for connection and the means engaged with the catapults are ejected with the seat and disengage from the outer catapults at their outer ends. The support means also include means for connecting the outer catapults to the aircraft.

The means connecting the seat to the means engaged with the outer catapults include collapsible truss structures attachable to the lower part of the seat and for holding the seat away from a lower inner end of the outer catapults and for holding the seat firmly in a semi-reclined position.

There are triangular truss means for preventing the seat from moving rearwardly in the semi-reclined position. The triangular truss means include the seat, the catapults forming first links of fixed length prior to ejection, stop means on the catapults for preventing the means engaged with the outer catapults from moving downwardly, and compression second links pivotally engaged at one of their ends with the means engaged with the outer catapults and having their outer ends secured to the seat, the compression links form parts of the collapsible truss structures.

During the ejection, as the inner catapult cylinders move outwardly, the first links, formed by the outer catapult and inner catapult cylinders, lengthen so as to cause the compression second links to rotate toward the outer catapult cylinders causing the seat to move rearwardly from the semi-reclined position to a more upright position and causing the collapsible truss structures to collapse.

There are locks for locking the inner and outer catapult cylinders together prior to ejection to fix the lengths of the first links, the locks being automatically opened during the ejection sequence by gas pressure in the catapults to permit the first links to be lengthened and to permit the seat to be ejected. The means for connecting the outer cylinders to the aircraft are seat adjustment means, each seat adjustment means having one end connected to a lower end of a respective outer cylinder and having its other end connected to the aircraft, and further include third links, each third link having one end pivotally connected to a respective outer cylinder adjacent its outer end and having its other end connected to the aircraft.

The means engaged with the outer cylinders for ejection with the seat and for disengagement from the outer cylinders at said outer end are slipper blocks slidably engaged with the outer cylinders, each slipper block being engaged with a respective outer cylinder, the slipper blocks being held on the outer cylinders by the collapsible truss structures.

The collapsible truss structures include telescoping tubes having extension stops for reacting tension loads, each tube having one end attached to one respective opposite side of the seat and having its other end attached to a respective slipper block. The seat is prevented from moving forwardly by tension maintained in the telescoping tubes, when extended, and by a fixed length relationship maintained between the telescoping tubes and the compression links, before ejection when the outer and inner catapult tubes are maintained by a fixed length as the first links, the length being determined by the slipper blocks being held at their lowest positions on the fixed catapult links. The telescoping tubes are compressed and have flow control orifices to emit air to prevent dynamic loads on the seat as it reaches the limit of its rearward motion when the compression links are rotated during ejection of the seat. The compression links are in the form of approximate A-frames, pivotal during ejection with respect to the catapults and are capable of reacting side loads.

The angle selected for the catapults and the seat inclination angle will determine the rearward motion necessary to reposition the seat for safer ejection. The extended and compressed lengths of the telescopic tubes will determine whether two or more tube segments are needed. The seat structure must be designed to accommodate the support concept according to the invention.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 3 is an approximate rear elevational view of the seat in FIG. 2 substantially illustrating the positions of the ejecting catapults;

FIG. 4 is an approximate plan view of the seat from above;

FIG. 5 is a fragmentary view illustrating an extension stop in a telescopic tube of a collapsible truss;

FIG. 6 is a fragmentary view of locking means for holding the inner and outer cylinders of catapults in a fixed length during normal flight operation;

FIG. 7 is a fragmentary schematic view taken substantially along the lines 7—7 in FIG. 1;

FIG. 8 is a fragmentary schematic view of a collapsible truss system, taken substantially along the lines 8—8 in FIG. 1;

BEST MODE FOR CARRYING OUT THE INVENTION

Figure 1:
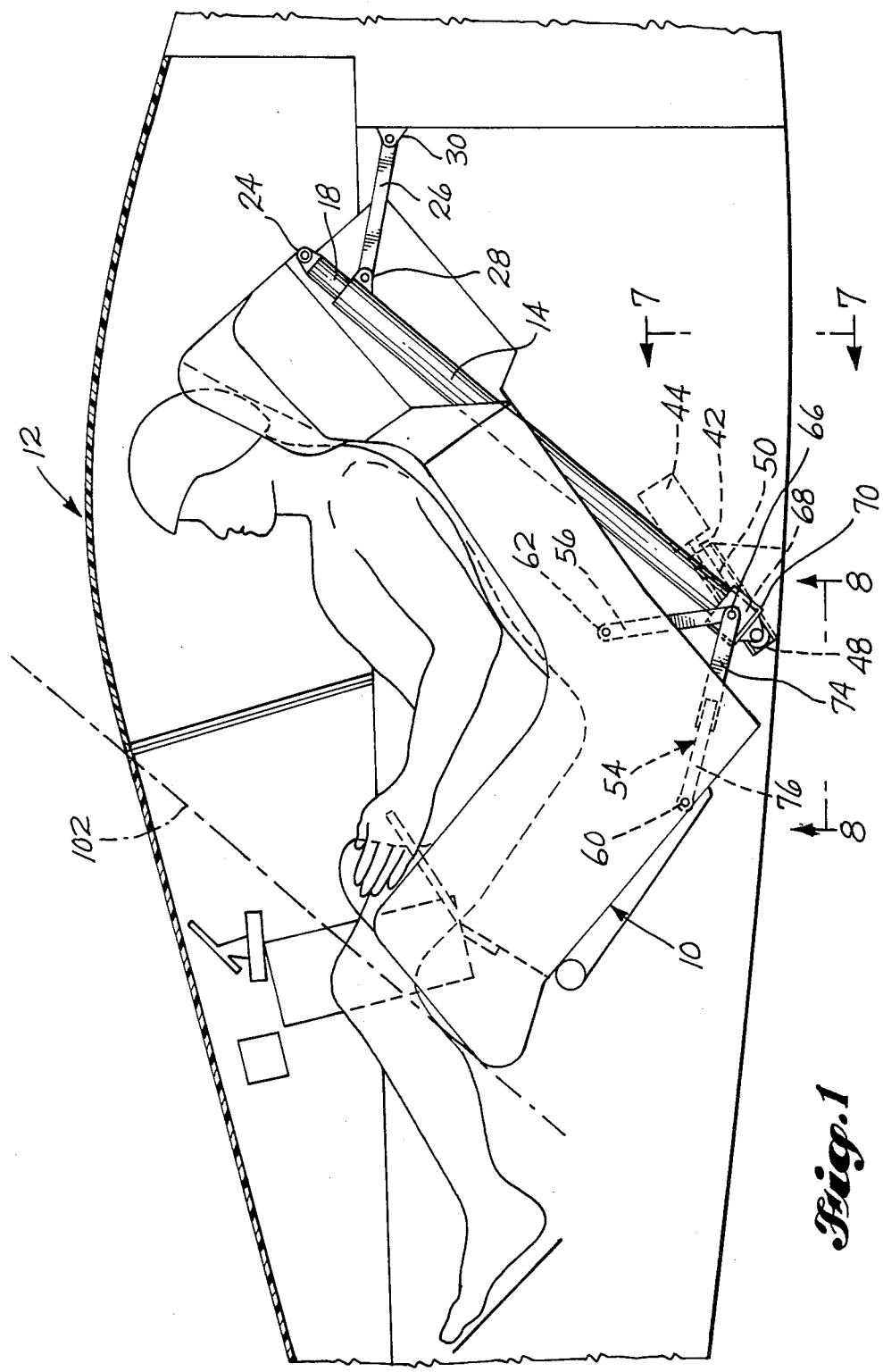
FIG. 1 is a side elevational view of an ejection seat, according to the invention, in a semi-reclined position for normal flight operation, and illustrating supporting truss structures schematically.

Referring again to the drawings, there is shown in FIG. 1 an ejection seat 10 in a semi-reclined position secured within an aircraft 12. The seat is secured to the aircraft structure by a pair of spaced ejection force delivery means or outer catapult cylinders 14 and 16, FIGS. 3 and 4, and slidably engaged and supported within the outer catapults are ejection means or inner catapult cylinders 18 and 20, the inner cylinders being secured at their outer ends 24 and 26 to carry the seats out of the aircraft during ejection.

The outer ends of the outer cylinders 14 and 16 are secured to the aircraft by upper anchor links 26 having one end 28 pivotally engage with a respective cylinder and having their outer ends 30 pivotally engaged with the aircraft structure.

Figure 2:
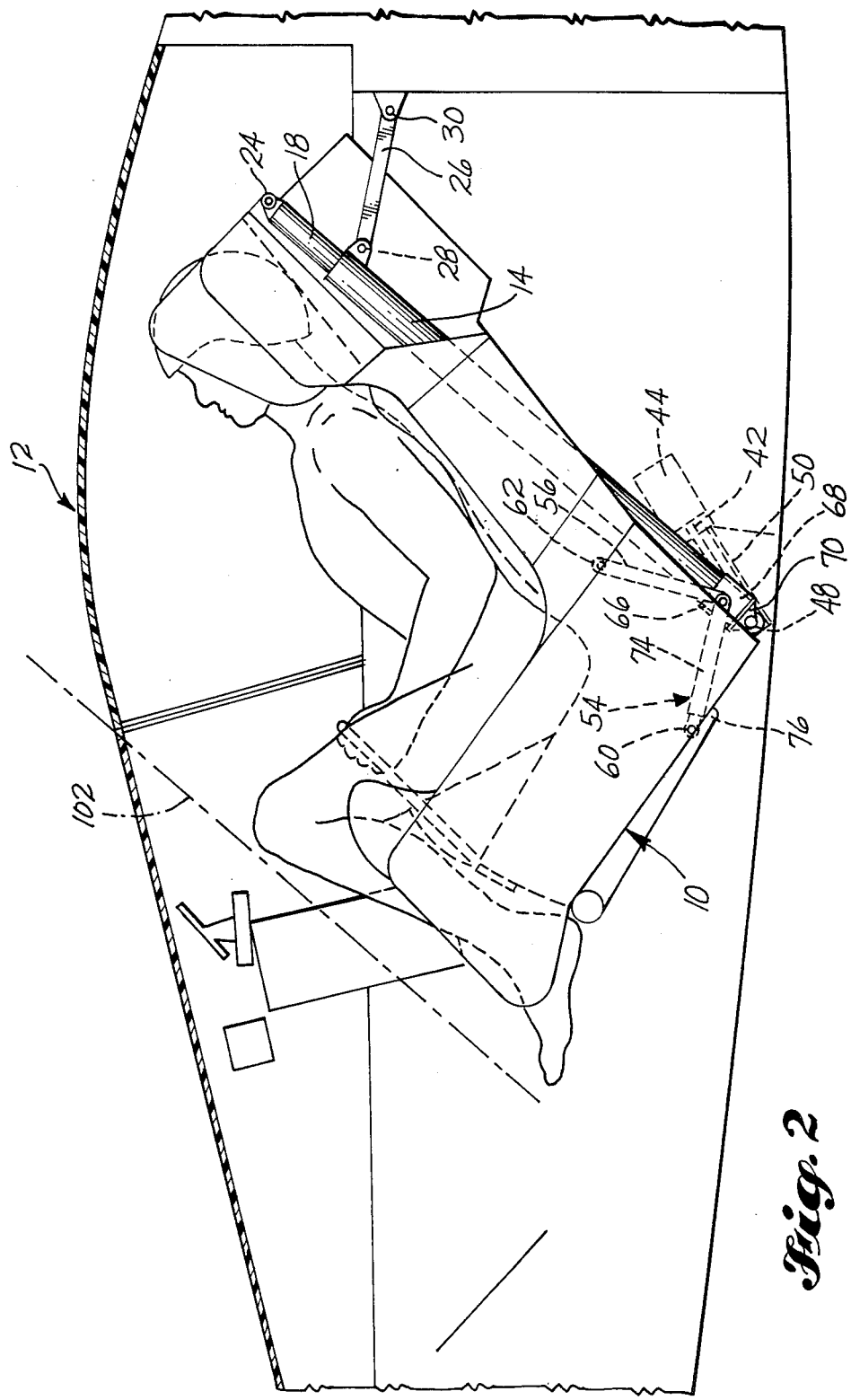
FIG. 2 is a side elevational view of the seat shown in FIG. 1, having been moved to a more upright position for safer ejection during the ejection sequence.

The lower end of the outer catapults, as best seen in FIG. 7, have a lug 34 extending therefrom and supporting a pin 36 extending therethrough. One end of the pin 36 is pivotally engaged with a nonrotatable nut 40. A threaded shaft 42 is threadedly engaged with the nut 40 and at its inner end the shaft is connected to an actuator 44 for adjusting the seat to higher and lower positions, according to the size of the occupant. As shown in FIGS. 1 and 2 the seat is at its lowest position in the aircraft. The other end of the pin 36 is engaged for relative rotation with the roller 48, slidably engaged within a short channel-shaped track 50.

On both sides of the seat, show schematically in FIGS. 1, 2 and 7 and shown in spaced-out detail in FIG. 8, are collapsible trusses formed of tension, telescoping links 54 and compression links 56, substantially in the form of A-frames. The outer ends of the links 54 and 56 are fixed in place at 60 and 62 to the seat, one pair being on each side. The inner ends of the links 54 and 56 are pivotally engaged to pins 66 on each side of the seat, each pin 66 being fixed to a slipper block 68. Each slipper block is comprised of almost half of a cylinder having a radius approximately equal to the outside radius of the outer catapults 14 so as to be slidably engaged therewith, as best seen in FIG. 8. At the lower ends of the catapults 14 and 16 there is a stop ring 70 to limit the downwardly movement of the slipper blocks on the catapults. Thus, the lower ends of the catapults are secured to the aircraft by the adjusting actuators 44, the nuts 40, the pins 36, the lugs 34, the rollers 48 and the tracks 50. Similarly, the lower end of the seat is connected to the outer catapults by the links 54 and 56, having their outer ends fixed to the seat and having their inner ends pivotally engaged with the slipper blocks so that the slipper blocks are held in engagement with the catapults, limited in downwardly movement by the stops 70 and adapted to slide outwardly on the catapults during the ejection when the inner cylinders 18 and 20 move outwardly of the outer cylinders and carry the seat and their attached links with them.

The links 54 and 56, supporting the slipper blocks on the catapults, hold the seat away from the lower part of the catapults in the semi-reclined position shown in FIG. 1. The links 54 are comprised of telescoping tubes 74 and 76 which have extension stops 78 and 80, FIG. 5, to react tension loads. The A-frame compression links, FIG. 8, are made so as to be capable of reacting side loads. The collapsible truss structures, links 54 and 56, hold the seat firmly in a prescribed reclined position, shown in FIG. 1, the telescoping links 54 when extended in tension holding the slipper blocks against the stops 70 and preventing the seat from moving forwardly.

The seat is prevented from moving rearwardly by a supporting triangular truss, formed on each side, by the seat structure, the inner and outer catapults, the stops 70, and the compression links 56. The slipper blocks 68 are restrained by the down stops 70 and the compression links 56.

Figure 9:
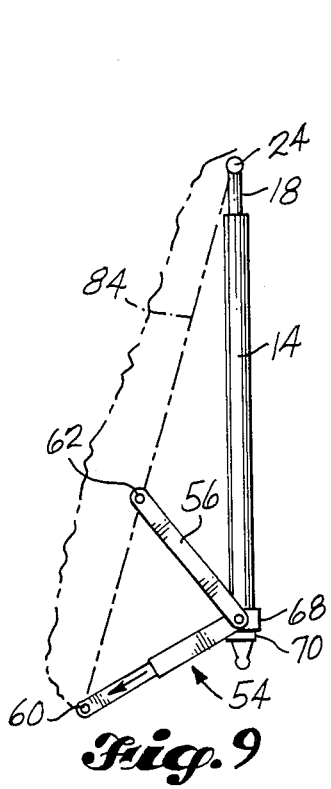
FIG. 9 is a side elevational schematic view of the collapsible truss shown in FIG. 8 during normal operation for holding the seat away from a lower inner end of the outer catapult cylinder and for holding the seat in a firmly semi-reclined position.

This is illustrated in FIG. 9 where any forces acting on the seat to move it rearwardly, the forces being such that would act rearward from the line 84 would be restrained by the triangular truss formed by the compression link 56, seat structure 84, and catapult and by the compression link 56 on the slipper blocks 58 and on the stops 70. The seat is prevented from moving forwardly by maintaining tension in the extended telescoping links 54 thus preventing the slipper blocks 58 from moving away from the stops 70 thereby maintaining a fixed length relationship between the telescoping links and the compression links while keeping the inner and outer catapults in the form of a single link of fixed length by means of internal locks 86, FIG. 6, the locks being in the form of pins 88 engaged in a bore 90 in the outer catapult 14. The inner end of each pin 88 is a piston 92 and is acted upon during normal situations by a spring 94 to hold the pin in the bore. The piston is adapted to move in a chamber 96 having an orifice 98 to receive gas formed below the lower end of the inner catapult 18. The gas enters the orifice 98 and moves the piston to the left to move the pin out of the bore 90 and thus the inner catapult cylinders are free to be ejected by the high pressure gas formed in the catapult system connected to the lower ends of the outer catapults, not shown.

Figure 10:
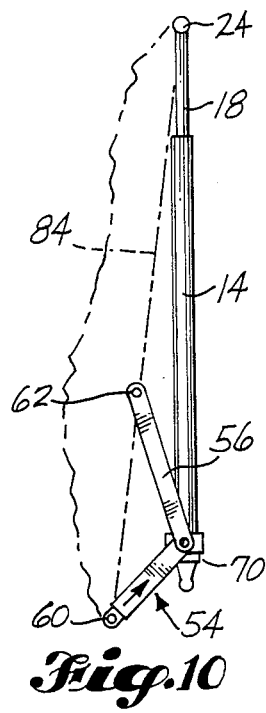
FIG. 10 is a schematic view of the truss in the collapsed position which the compression link have been rotated toward the catapults and a telescopic tube has been collapsed during the ejection sequence.
Figure 11:
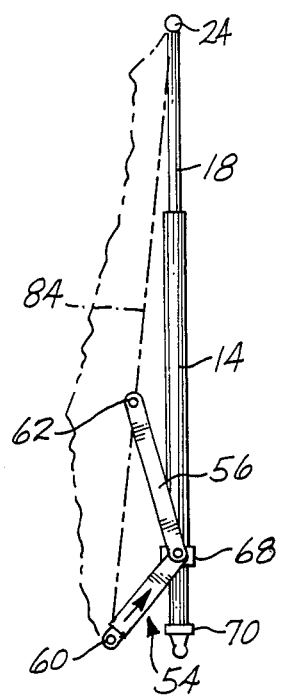
FIG. 11 is a schematic view of the collapsible truss during the ejection sequence in which the actual upward movement of the seat has commenced.

During the ejection sequence when high pressure gas is caused to move into the lower end of the outer catapults, the lengths of the catapults increase as the inner catapult 18 and 20 move outwardly of the outer catapults as indicated in FIGS. 2 and 10. This causes the compression link 56 to rotate, collapsing toward the links formed by the catapults and causes the seat to move rearwardly to the position shown in FIG. 2. As this occurs, the telescoping links 54 are compressed, expelling air through both control orifices 100, FIG. 8, so as to provide a controlled damping force to prevent high dynamic loads on the seat as it reaches the limit of its rearward movement indicated in FIGS. 2 and 10. After the seat has moved to the position shown in FIG. 2 which is in a substantially more upright position than the seat in FIG. 1, as indicated by the broken lines 102, the seat continues to move outwardly as indicated in FIG. 11 with the sliding blocks 68 and the links 54 and 56 being carried out of the aircraft along with the seat.

The angle selected for the catapult and the seat inclination angle determine the rearward motion necessary to reposition the seat for ejection, according to the invention. The extended and compressed links of the telescopic tube links 54 will determine whether two or more tube segments are required. It follows that the seat structure must be designed to accommodate the supporting concept and the ejection process, according to the invention.

The invention and its attendant advantages will be understood from the foregoing description and it will be apparent that various changes may be made in the form, construction, and arrangements of the parts of the invention without departing from the spirit and scope of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. Apparatus for repositioning an aircraft ejection seat during the ejection sequence, from a semi-reclined position to a more upright position for safer ejection, comprising:
    ejection means for being connectable to an ejection seat to carry the seat out of the aircraft;
    ejection force delivery means for supporting said ejection means and for supplying force to the ejection means to eject the ejection means from an outer end of the force delivery means and the seat from the aircraft;
    seat support means including the ejection means, the force delivery means, means for connection to the seat having means engaged with the force delivery means for ejection with the seat and for disengagement from the delivery means at said outer end, and means for connecting the delivery means to the aircraft;
    said means for connection to the seat including collapsible truss structures attachable to the lower part of the seat and for holding the seat away from a lower inner end of the force delivery means and firmly in a semi-reclined position;
    triangular truss means for preventing the seat from moving rearwardly in the semi-reclined position, said triangular truss means including the seat, the force delivery means and ejection means forming first links of fixed length prior to ejection, stop means on the force delivery means for preventing the means engaged with the force delivery means from moving downwardly, and compression second links pivotally engaged at one of their ends with said last means engaged and having their other ends securable to the seat, said compression links forming parts of the collapsible truss structures,
    whereby during ejection, as the ejection means move outwardly, the force delivery and ejection means first links lengthen so as to cause the compression second links to collapse in rotation toward the force delivery means causing the seat to move rearwardly from the semi-reclined position to more upright position and causing the other parts of the collapsible truss structures to collapse.

2. The invention according to claim 1 in which:
    said ejection force delivery means are outer catapult cylinders, one being positionable adjacent each of respective opposite rear sides of the seat;
    said ejection means are inner catapult cylinders, each being within a respective outer cylinder and having their outer ends securable adjacent the outer ends of the seat;
    locks for locking the inner and outer cylinders together to fix the lengths of the first links; and
    means to automatically open the locks during the ejection sequence to permit the first links to be lengthened and to permit the seat to be ejected.

3. The invention according to claim 2 in which:
    said means for connecting the delivery means to the aircraft include seat adjustment means, each seat adjustment means having one end connected to a lower end of a respective outer cylinder and having its other end for connecting to the aircraft.

4. The invention according to claim 3 in which:
    said means for connecting the delivery means to the aircraft further include third links, each third link having one end pivotally connected to a respective outer cylinder adjacent its outer end and having its other end for connecting to the aircraft.

5. The invention according to claim 2 in which:
    said means engaged with the force delivery means for ejection with the seat and for disengagement from the delivery means at said outer end are slipper blocks slidably engaged with the outer cylinders, each slipper block being engaged with a respective outer cylinder,
    said slipper blocks being held on said outer cylinders by said collapsible truss structures when attached to the seat.

6. The invention according to claim 5 in which:
    said collapsible truss structures including telescoping tubes having extension stops for reacting tension loads, each telescoping tube having one end for being attachable to one respective opposite side of the seat and having its other end attached to a respective slipper block;

said seat being prevented from moving forwardly by tension maintainable in the telescoping tubes when extended and by a fixed length relationship maintainable between the telescoping tubes and the compression links, while before ejection, the outer and inner catapult tubes are maintained at a fixed length as said first links;

the telescoping tubes being compressed and having flow control orifices to emit air to prevent dynamic loads on the seat as it reaches the limit of its rearward motion when the compression links are rotated during ejection of the seat.

7. The invention according to claim 6 in which:

said compression links are approximate A-frames, pivotal during ejection with respect to the catapults and capable of reacting side loads.

8. An ejection seat mounted in an aircraft, the seat being repositionable during the ejection sequence from a semi-reclined position to a more upright position for safer ejection, comprising:

ejection means connected to the seat to carry the seat out of the aircraft;

ejection force delivery means supporting the ejection means and for supplying force to the ejection means to eject the ejection means from an outer end of the force delivery means and the seat from the aircraft;

seat support means including the ejection means, the force delivery means, means connected to the seat having means engaged with the force delivery means for ejection with the seat and for disengagement from the delivery means at said outer end, and means connecting the delivery means to the aircraft;

said means connecting to the seat including collapsible truss structures attached to the lower part of the seat for holding the seat away from a lower inner end of the force delivery means and firmly in a semi-reclined position;

triangular truss means preventing the seat from moving rearwardly in the semi-reclined position, said triangular truss means including the seat, the force delivery means and ejection means forming first links of fixed length prior to ejection, stop means on the force delivery means for preventing the means engaged with the force delivery means from moving downwardly, and compression second links pivotally engaged at one of their ends with said last means engaged and having their other ends secured to the seat, said compression links forming parts of the collapsible truss structures, whereby during ejection, as the ejection means move outwardly, the force delivery and ejection means first links lengthen so as to cause the compression second links to collapse in rotation toward the force delivery means causing the seat to move rearwardly from the semi-reclined position to a more upright position and causing the other parts of the collapsible truss structures to collapse.

9. The invention according to claim 8 in which:

said ejection force delivery means are outer catapult cylinders, one being positionable adjacent each of respective opposite rear sides of the seat;

said ejection means are inner catapult cylinders, each being within a respective outer cylinder and having their outer ends secured to the seat adjacent the outer ends thereof;

locks for locking the inner and outer cylinders together to fix the lengths of the first links; and means to automatically open the locks during the ejection sequence to permit the first links to be lengthened and to permit the seat to be ejected.

10. The invention according to claim 9 in which:

said means connecting the delivery means to the aircraft include seat adjustment means, each seat adjustment means having one end connected to a lower end of a respective outer cylinder and having its other end connected to the aircraft.

11. The invention according to claim 10 in which:

said means connecting the delivery means to the aircraft further include third links, each third link having one end pivotally connected to a respective outer cylinder adjacent its outer end and having its other end connected to the aircraft.

12. The invention according to claim 9 in which:

said means engaged with the force delivery means for ejection with the seat and for disengagement from the delivery means at said outer end are slipper blocks slidably engaged with the outer cylinders, each slipper block being engaged with a respective outer cylinder, said slipper blocks being held on said outer cylinders by said collapsible truss structures.

13. The invention according to claim 12 in which:

said collapsible truss structures including telescoping tubes having extension stops for reacting tension loads, each telescoping tube having one end attached to one respective outer opposite side of the seat and having its other end attached to a respective slipper block;

said seat being prevented from moving forwardly by tension maintained in the telescoping tubes when extended and by a fixed length relationship maintained between the telescoping tubes and the compression links, while before ejection, the outer and inner catapult tubes are maintained at a fixed length as said first links;

the telescoping tubes being compressed and having flow control orifices to emit air to prevent dynamic loads on the seat as it reaches the limit of its rearward motion when the compression links are rotated during ejection of the seat.

14. The invention according to claim 13 in which:

said compression links are approximate A-frames pivotal during ejection with respect to the catapults and capable of reacting side loads.

15. A method of repositioning an aircraft ejection seat during the ejection sequence, from a semi-reclined position to a more upright position for safer ejection, comprising:

supporting the seat in the aircraft: with ejection means to carry the seat out of the aircraft; with ejection force delivery means for supplying force to the ejection means to eject the ejection means from an outer end of the force delivery means and the seat from the aircraft, and to guide the ejection means during the ejection; means for connection to the seat having means engaged with the force delivery means for ejection with the seat and for disengagement from the delivery means at said outer end; and means for connecting the delivery means to the aircraft;

said means for connection to the seat including collapsible truss structures attached to the lower part of the seat and for holding the seat away from a lower inner end of the force delivery means and firmly in a semi-reclined position;

preventing the seat from moving rearwardly in the semi-reclined position with triangular truss means, the triangular truss means including compression first links pivotally engaged at one of their ends with said last means engaged and having their other ends secured to the seat, said compression links forming parts of the collapsible truss structures;

moving the ejection means outwardly of the force delivery means during an early period of the ejection sequence to lengthen second links formed by the ejection means and force delivery means; said second links being of fixed length before the ejection sequence commences;

collapsing the collapsible truss structures including rotating the compression links toward the force delivery means; and moving the seat rearwardly from a semi-reclined position to a more upright position prior to ejection from the aircraft.

16. The method according to claim 15 further including in the triangular truss means:

the seat, the force delivery means and ejection means of fixed length prior to ejection, stop means on the force delivery means for preventing the means engaged with the force delivery means from moving downwardly.

17. The method according to claim 16 including:

unlocking the ejection means and the force delivery means when the ejection sequence commences;

said ejection force delivery means being outer catapult cylinders, one being positioned adjacent each of respective outer rear sides of the seat; and said ejection means being inner catapult cylinders, each being within a respective outer cylinder and having their outer ends securable adjacent the outer ends of the seat.

18. The method according to claim 17 including:

sliding said means engaged on the outer cylinders and disengaging the means engaged from the outer cylinders at said outer end during ejection;

said means engaged with the force delivery means being slipper blocks slidably engaged with the outer cylinders, each slipper block being engaged with a respective outer cylinder, said slipper blocks being held on said outer cylinders by said collapsible truss structures including the compression links.

19. The method according to claim 18 including:

preventing the seat from being moved forwardly by maintaining tension in telescoping tubes in the collapsible truss structures when the tubes are extended, and by maintaining a fixed length relationship between the telescoping tubes and the compression links, before ejection, and while the outer and inner catapult tubes are maintained at a fixed length as said links;

said telescoping tubes having extension stops for reacting tension loads;

each telescoping tube having one end attached to one respective opposite side of the seat and having its other end attached to a respective slipper block.

20. The method according to claim 19 including:

compressing the telescoping tubes and emitting air from the tubes to prevent dynamic loads on the seat as it reaches the limit of its rearward motion when the compression links are rotated during the ejection of the seat;

said compression links being approximate A-frames pivotal during ejection with respect to the catapult and capable of reacting side loads.

* * * * *

UNITED STATES PATENT AND TRADEMARK OFFICE
CERTIFICATE OF CORRECTION

PATENT NO. : 4,613,101

DATED : September 23, 1986

INVENTOR(S) : Gerald F. Herndon

It is certified that error appears in the above-identified patent and that said Letters Patent are hereby corrected as shown below:

Cover page, left column, 7th patent document,
   "McDonald" should be -- MacDonald et al. --.

Column 2, line 11, "outer", second occurrence, should be
   -- other --.

Column 3, line 62, "outer" should be -- other --.

Signed and Sealed this

Third Day of February, 1987

Attest:

DONALD J. QUIGG

Attesting Officer

Commissioner of Patents and Trademarks